United States Patent
Potthast et al.

(10) Patent No.: US 10,782,656 B2
(45) Date of Patent: Sep. 22, 2020

(54) METHOD AND DEVICE FOR INFLUENCING A VEHICLE BEHAVIOR

(71) Applicant: Robert Bosch GmbH, Stuttgart (DE)

(72) Inventors: Christian Potthast, Kornwestheim (DE); Fabian Jarmolowitz, Stuttgart (DE); Kosmas Petridis, Waiblingen (DE); Matthias Bitzer, Stuttgart (DE); Thomas Bleile, Stuttgart-Zuffenhausen (DE); Lars Hagen, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 260 days.

(21) Appl. No.: 15/778,930

(22) PCT Filed: Nov. 28, 2016

(86) PCT No.: PCT/EP2016/078937
§ 371 (c)(1),
(2) Date: May 24, 2018

(87) PCT Pub. No.: WO2017/093156
PCT Pub. Date: Jun. 8, 2017

(65) Prior Publication Data
US 2018/0341233 A1 Nov. 29, 2018

(30) Foreign Application Priority Data
Dec. 2, 2015 (DE) .......... 10 2015 223 974

(51) Int. Cl.
*G05B 13/04* (2006.01)
*G05B 17/02* (2006.01)
(Continued)

(52) U.S. Cl.
CPC .......... *G05B 13/042* (2013.01); *G05B 13/04* (2013.01); *G05B 17/02* (2013.01); *B60W 60/001* (2020.02);
(Continued)

(58) Field of Classification Search
None
See application file for complete search history.

(56) References Cited

U.S. PATENT DOCUMENTS 5,867,089 A 2/1999 Zyburt et al.
7,346,402 B1 3/2008 Stahl
(Continued)

FOREIGN PATENT DOCUMENTS

| CN | 103118340 A | 5/2013 |
|---|---|---|
| EP | 2669172 A1 | 12/2013 |
| EP | 2715459 A1 | 4/2014 |

OTHER PUBLICATIONS

International Search Report for PCT/EP2016/078937, dated Apr. 21, 2017.

*Primary Examiner* — Kenny S Lin
(74) *Attorney, Agent, or Firm* — Norton Rose Fulbright US LLP; Gerard Messina

(57) ABSTRACT

A method for parameterizing a functional software of a vehicle, including: receiving information about a vehicle state, transmitting the information about the vehicle state via a communication interface addressed to a remote processing unit outside the vehicle, and receiving, at the local processing unit in the vehicle, information about at least one parameter for influencing the vehicle behavior, which was transmitted by the remote processing unit outside the vehicle, via the communication interface.

19 Claims, 2 Drawing Sheets

(51) Int. Cl.
  *B60W 60/00* (2020.01)
  *B60W 50/00* (2006.01)
(52) U.S. Cl.
  CPC ............... *B60W 2050/0002* (2013.01); *G05D 2201/0213* (2013.01)

(56) References Cited

U.S. PATENT DOCUMENTS

| | | | | |
|---|---|---|---|---|
| 2012/0277940 | A1* | 11/2012 | Kumar | B61L 27/0027 701/20 |
| 2015/0266455 | A1* | 9/2015 | Wilson | G09B 19/10 701/93 |
| 2016/0009304 | A1* | 1/2016 | Kumar | B61L 27/0027 701/19 |

* cited by examiner

METHOD AND DEVICE FOR INFLUENCING A VEHICLE BEHAVIOR

FIELD OF THE INVENTION

The present invention relates to a method and device for influencing a vehicle behavior.

BACKGROUND INFORMATION

The behavior of vehicles, in particular motor vehicles, is determined by control units, for example engine control units. These control units are connected via a data bus, for example a CAN bus, among one another and to sensors and actuators for influencing the vehicle behavior.

A functional software runs on the control units, which reads pieces of information about the vehicle state from the data bus, evaluates these, and activates actuators for influencing the vehicle behavior as a function of the result of the evaluation.

The functional software is typically adapted to a certain vehicle with the aid of parameterization. For this purpose, measurements of the vehicle state in certain driving situations are usually conducted. These measurements are analyzed. If necessary, parameters are changed as a function of the result of the analysis.

A quality criterion is used to assess the actual vehicle behavior. The parameterization is completed when the quality criterion is met.

The vehicle must be physically available in order to conduct the measurements and for the parameterization. For example, the measurements are conducted on a test bench or on a test track.

This gives rise to the problem that, due to the availability of vehicles, the parameterization is only possible with the aid of individual vehicles or individual variants, for example a single engine, and using a very limited scope of measuring data.

SUMMARY OF THE INVENTION

It is thus an object of the present invention to improve a method and a device of the type mentioned at the outset so that the parameterization is simplified, and the result of the parameterization is further improved.

This object may be achieved according to the present invention by a method and a device as recited in the independent claims.

Technical measures thus make it possible to parameterize a functional software of a vehicle by:
- receiving a data set including information about a vehicle state in particular via a local data bus at a local processing unit in the vehicle;
- transmitting the information about the vehicle state via a communication interface addressed to a remote processing unit outside the vehicle; and
- receiving, at the local processing unit in the vehicle, information about at least one parameter for influencing the vehicle behavior, which was transmitted from the remote processing unit outside the vehicle, via the communication interface.

An information content of a received data set may be ascertained, it being ascertained as a function of the information content of the received data set and a predetermined model for a vehicle behavior as to whether an information gain exists as a result of the received data set.

The information content of a data set may be compared to a received information content, a data set being transmitted via the communication interface as a function of the result of the comparison.

A data set which is to be transmitted via the communication interface may be stored in a buffer prior to transmission, the content of the buffer being transmitted via the communication interface when the information content exceeds a predefined threshold value for the information content.

Data sets may be sorted as a function of their respective information content.

A data set may be deleted when a memory space usage exceeds a threshold value for the memory space usage, and the information content assigned to the data set falls below a predefined threshold value for the information content.

A parameter optimization may be carried out at the remote processing unit outside the vehicle as a function of one or multiple data set(s) received by the local processing unit in the vehicle.

The information content may be ascertained at the remote processing unit outside the vehicle as a function of multiple data sets received by the local processing unit in the vehicle.

The parameter optimization or ascertainment of the information content may be carried out as a function of multiple data sets which are received by different vehicles from the remote processing unit outside the vehicle.

A device and a computer program are also provided.

Further advantageous embodiments are the subject matter of the further descriptions herein.

Exemplary specific embodiments of the present invention are described hereafter with reference to the drawings.

DETAILED DESCRIPTION

Figure 1:
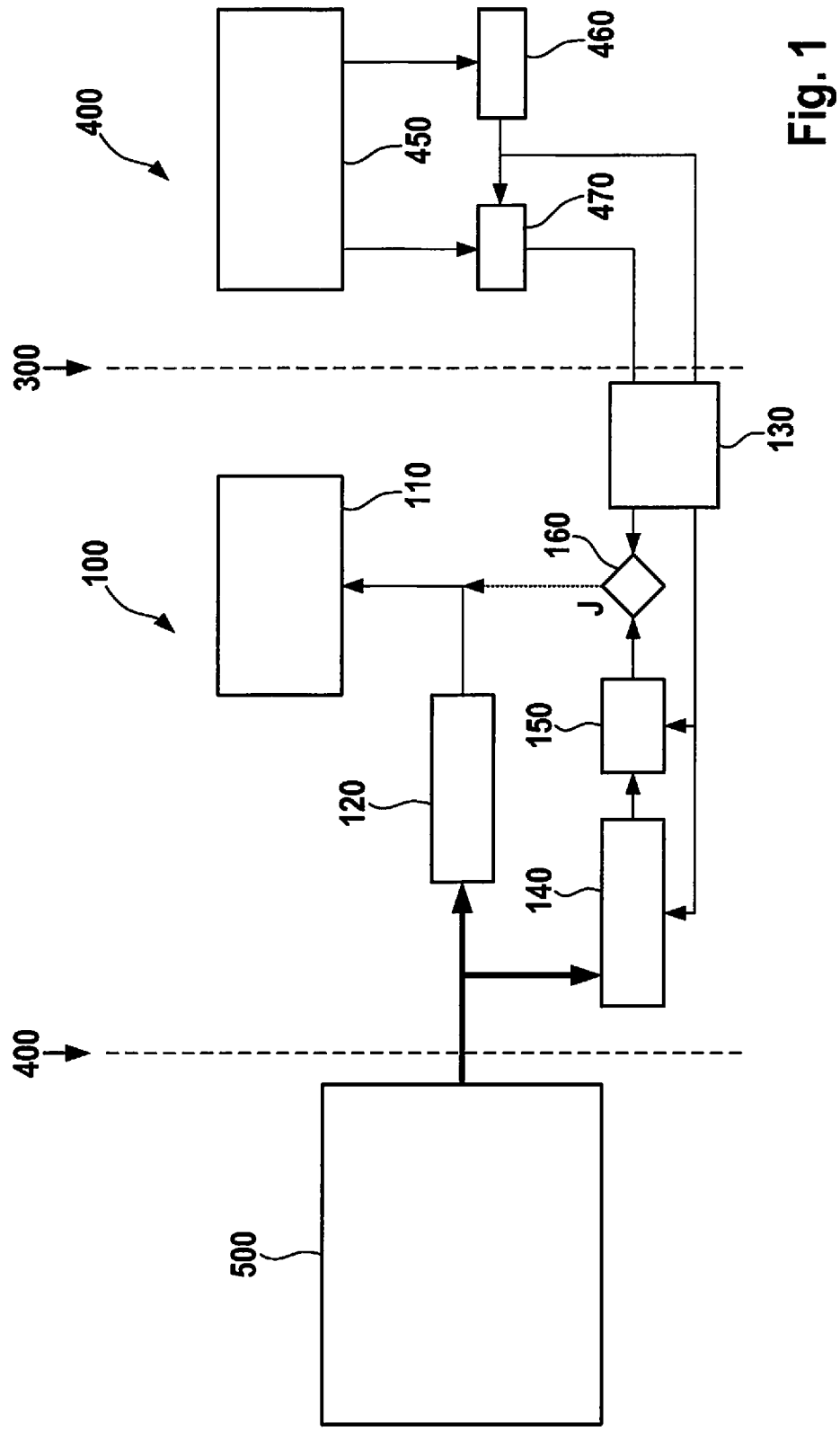
FIG. 1 schematically shows one embodiment of a system for parameterization.

FIG. 1 schematically shows a system for parameterization. A local processing unit 100 in a vehicle is connected via a communication interface 300 to a remote processing unit 400 outside a vehicle. Via communication interface 300, a link via a radio network, for example a mobile communication network, is possible. Communication interface 300 is based on LTE, LTE Advanced or UMTS, for example.

Local processing unit 100 includes a transmitter 110 for transmitting data via communication interface 300. Transmitter 110 may include an output memory for data sets. Data sets are also referred to as measuring segments hereafter.

Local processing unit 100 includes a receiver 120. Receiver 120 may include an input memory for data sets.

Local processing unit 100 is connectable via a communication interface 400 to a control unit 500 of a vehicle. Data interface 400 is a CAN bus interface, for example. A radio interface or another wired interface may also be provided.

Figure 3:
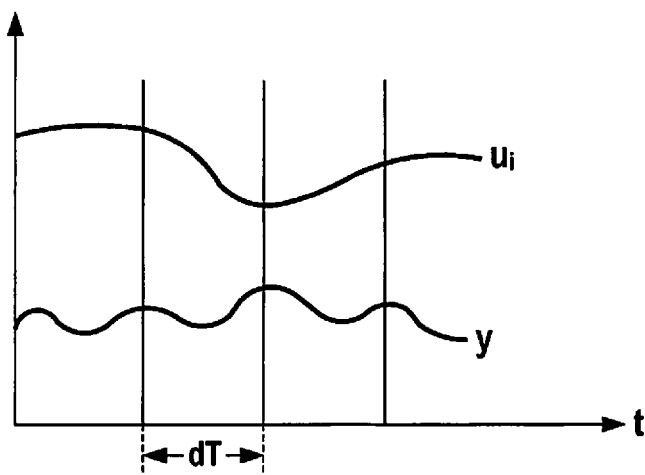
FIG. 3 schematically shows portions of a measurement.

FIG. 3 schematically shows a portion of a measurement used for the parameterization of a functional software. This measurement is received in local processing unit 100 by receiver 120. The measurement may be recorded by control unit 500.

For example, curves of a first characteristic U, for example an engine speed, and of a second characteristic Y, for example an engine torque, are recorded as chronological curves. FIG. 3 shows a chronological curve of two measured variables ui and y in this regard. The measurement is divided into measuring segments dT. These are illustrated in FIG. 3 by lines which are represented at distance dT perpendicular to the time axis.

A measurement U(T), Y(T) includes a time value t, or multiple time values t, and values of measured variables ui and y corresponding thereto. A measuring segment U(dTk), Y(dTk) includes a corresponding subset of values.

Local processing unit 100 furthermore includes a further receiver 130. Receiver 130 is configured to receive data, in particular information about parameters θ, or an information content I(T) via communication interface 300 from remote processing unit 400.

Local processing unit 100 moreover includes a first evaluation unit 140, a second evaluation unit 150, and a decider 160.

First evaluation unit 140 is configured to establish a further information content I(dT), which is supplied by the measuring segment with respect to parameter θ, as a function of a measuring segment incoming at receiver 120 and as a function of information about a parameter θ received by further receiver 130.

Second evaluation unit 150 is configured to ascertain, as a function of the result of the evaluation by first evaluation unit 140 and as a function of information about parameter θ received by further receiver 130, as to whether an information gain with respect to parameter θ was achieved as a result of the incoming measuring segment.

Decider 160 is configured to generate a signal for activating transmitter 110, as a function of the result of the evaluation by second evaluation unit 150 and the information about information content I(T) received by further receiver 130.

Decider 160 compares information content I(dT) of the measuring segment to a predefined threshold value for the information content. When information content I(dT) of the measuring segment exceeds the predefined threshold value for the information content, decider 160 signals to transmitter 110 that an information gain exists.

When transmitter 110 receives this signal, transmitter 110 transmits the content of the output memory via communication interface 300 to remote processing unit 400.

The threshold value may be determined as a function of information content I(T) received by further receiver 130. The threshold value for the information content is, for example, information content I(T) received by further receiver 130.

Figure 2:
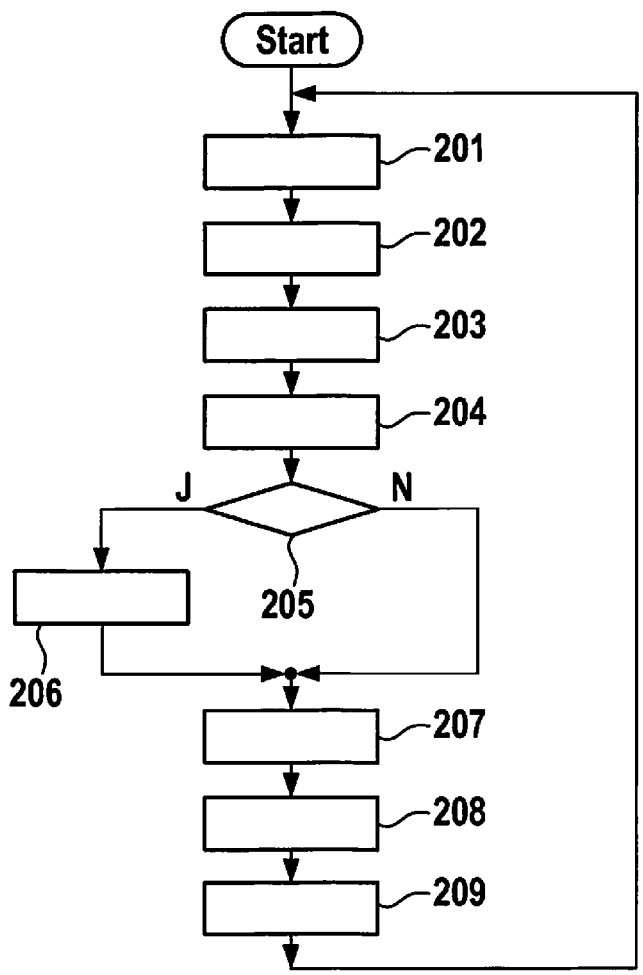
FIG. 2 schematically shows a portion of a method for parameterization.

A method for parameterizing the functional software running in the control unit of a vehicle is described hereafter based on FIG. 2.

The method begins, for example, by starting a parameterization function of a software running on local processing unit 100 in the vehicle.

After the start, information about the vehicle state of the vehicle is received in a step 201. The information may be received at local processing unit 100 in the vehicle on which the parameterization function is running. The information about the vehicle state may be transmitted via a local data bus to local processing unit 100 in the vehicle.

A data set which may be transmitted as information about the vehicle state includes mutually assigned data of a measuring segment. For example, curves of first characteristic U, for example the engine speed, and of second characteristic Y, for example the engine torque, are recorded as chronological curves. In this case, a data set includes, for example, multiple triples (ui, y, t), each made up of a value of the engine speed, a value of the engine torque, and the time at which both were measured.

The information may be recorded by a vehicle sensor or by control unit 500 in the vehicle.

The entire measuring segment may be transmitted in one data set. It may also be provided to transmit measuring data continuously to local processing unit 100. In this case, it may be provided to divide received measuring data in local processing unit 100 into predetermined time periods dT as measuring segments.

Thereafter, a step 202 is carried out.

In step 202, a model M(θ) is ascertained as a function of the received data set and the information about parameter θ which was received by further receiver 130. Model M(θ) forms an estimated chronological curve of characteristics U or Y.

Thereafter, a step 203 is carried out.

In step 203, information content I(dTK) of the received data set is ascertained and assigned thereto. Information content I(dTK) is a measure with the aid of which the relevance of the received data set with respect to the parameterization may be assessed. For example, Fisher information is used for this purpose. The Fisher information supplies a measure for the quality of a parameter estimation with respect to model M(θ).

The determination of the information content takes place for a measuring segment dTK, for example. This exists for a certain time duration dTK={tk–N, . . . tk}.

For this purpose, information content I(dTk) of a measuring segment U(dTk), Y(dTk) is assessed.

The goal of the parameterization is to achieve, with the aid of model M(θ), i.e., the estimated chronological curve of characteristics U or Y, the actual chronological curve from the measurement of characteristics U or Y with a predefined or predefinable quality. For a parameter θ which influences the curve of characteristics U or Y in the vehicle, a piece of information I(θ) from the measurement with respect to parameter θ of model M(θ) is crucial:

$$I(\theta)=I(Y(dTk),M(U(dTk),\theta))$$

Information content I(dTK)=I(θ) depends both on the measurement in measuring segment U(dTk), Y(dTk) and on model M(θ) itself. For example, Fisher information IF is used for assessing the information. In this case, information content I(dTK)=IF(θ).

The Fisher information is used as follows in the example:

$$I_F(\theta) = E\left[\left(\frac{\partial}{\partial \theta}\log(L(Y;\theta))\right)^2 \Big| \theta\right]$$

using the probability density function L(Y; θ) of Y on the condition θ, or the probability function for θ. Function L(Y; θ) represents a stochastic description of model M(θ).

Thereafter, a step 204 is carried out.

In step 204, data sets in the buffer are sorted as a function of their respective information content. Information content I(dTK) of multiple data sets relative to one another may be compared for this purpose.

Thereafter, a step 205 is carried out.

In step 205, it is checked whether the information content of the received data set exceeds a predefined threshold value for the information content. With this, it is established whether an information gain with respect to the parameter was achieved as a result of the received data set.

It is advantageous for the parameterization concept when information content I(dTK) of a measuring segment U(dTK), Y(dTK) assessed not only in absolute terms, i.e., using a scalar metric, but when information content I(dTK) of multiple measurements relative to one another is assessed. A measure of the similarity of information is provided hereafter.

When using Fisher information IF, a measure is the comparison of the main components of two pieces of Fisher information IF1; IF2.

In the example, a first piece of Fisher information IF1 is determined as information content I(dK) of measuring segment U(dTK), Y(dTK) for the first main component.

In the example, the second main component for piece of Fisher information IF2 is received as information content I(T) from local processing unit 100 at further receiver 130.

In the example, remote processing unit 400 determines this information content I(T) with the aid of Fisher information, as is described for the determination of information content I(dK) of a measuring segment. From this results Fisher information IF(T) of remote processing unit 400. This determination takes place, for example, with the aid of one measuring segment U(dTK), Y(dTk) or with the aid of multiple measuring segments Ui(dTk), Yi(dTk). Measuring segment U(dTk), Y(dTk) or measuring segments Ui(dTk), Yi(dTk) may stem from one or multiple vehicle(s).

Another measure is the use of the Cramer-Rao inequality, which indicates a lower bound $$Cov(\theta) \geq I_F^{-1}(\theta^*)$$

for the covariance Cov(θ) of the error of the parameter estimation for an unbiased parameter estimator, having knowledge of the true θ*. Since θ* is not known, the instantaneously estimated θ' must be used. If a measurement now significantly reduces the covariance, estimated by $IF^{-1}$ (θ'), it supplies a high information gain. In this case, remote processing unit 400 determines instantaneously estimated θ', for example. In this case, a transmission of instantaneously estimated θ' instead of the transmission of information content I(T) to further receiver 130 may take place. Local processing unit 100 ascertains covariance Cov(θ') or the estimation with the aid of $IF^{-1}(\theta')$.

This means that, the threshold value for the information content may be information content I(T) which was received by further receiver 130.

As an alternative, the threshold value is a threshold for the reduction of covariance Cov(θ').

If the predefined threshold value for the information content is exceeded, a step 206 is carried out; otherwise a step 207 is carried out.

In step 206, a content of the buffer is transmitted via communication interface 300. The information about the vehicle state may be transmitted via communication interface 300 addressed to a remote processing unit 400 outside the vehicle. All data sets stored in the buffer may be transmitted.

This means that a data set is transmitted via communication interface 300 as a function of the result of the comparison in step 205.

Thereafter, step 207 is carried out.

In step 207, a data set is deleted from the buffer when the information content assigned to the data set falls below a predefined threshold value for the information content. All data sets which in the sorting of the data sets may be situated below the threshold value for the information content are deleted.

Thereafter, a step 208 is carried out.

Multiple incoming data sets including information about the vehicle state may be stored for a predetermined time duration, for example 10 minutes, one hour, or one day, in the local memory prior to transmission.

For this purpose, steps 201 and 207 are repeated, for example for the predetermined time duration. Only thereafter is step 208 carried out.

In step 208, information about at least one parameter θ for influencing the vehicle behavior, which was transmitted by remote processing unit 400 outside the vehicle, is received at local processing unit 100 in the vehicle via the communication interface.

It may be provided, in step 208, to wait for the reception of parameters θ at communication interface 300 and to repeat steps 201 through 207 during the waiting period.

Thereafter, a step 209 is carried out.

In step 209, a received parameter θ is stored in local processing unit 100.

Parameters θ which are received at local processing unit 100 in the vehicle may be used to influence the vehicle behavior with the aid of the functional software.

Parameters θ may be transmitted from local processing unit 100 in the vehicle to a control unit. The transmission may be started automatically or by a corresponding function of the parameterization software.

Thereafter, step 201 is carried out. If steps 201 through 207 were repeated, steps 208 and 209 are carried out in parallel, for example, and the parallel process is ended after step 209.

To protect against erroneous parameters or to avoid the parameterization with parameters from non-authorized senders, encryption techniques or authentication techniques, such as a virtual private network, known as VPN, connection, via an Internet connection, for example a TCP/IP connection, or with the aid of an LTE Advanced connection may be used. In this case, communication interface 300 is configured to use the corresponding protocols.

Steps of a method which runs on remote processing unit 400 are described hereafter. This method starts, for example, when data sets from local processing unit 100 arrive at remote processing unit 400. Information content I(T) may be determined by remote processing unit 400 as described above as Fisher information IF(T). If the Cramér-Rao inequality is used, it may also be provided to ascertain and to transmit parameter θ'.

After the start, a parameter optimization is carried out at remote processing unit 400 outside the vehicle as a function of one or multiple data set(s) received from local processing unit 100 in the vehicle.

Information content I(T) may be ascertained on remote processing unit 400 outside the vehicle as a function of multiple data sets received from local processing unit 100 in the vehicle.

The parameter optimization or the ascertainment of the information content may be carried out as a function of multiple data sets which are received by different vehicles from remote processing unit 400 outside the vehicle. For this purpose, it may be provided to use data sets of different vehicles together at remote processing unit 400. For this purpose, remote processing unit 400 is at least intermittently in communication with local processing units 100 of different vehicles.

Remote processing unit 400 includes a memory 450, for example a database, in which a recorded data set of a vehicle or the recorded data sets are stored assigned to the corresponding vehicles.

Remote processing unit 400 includes a processor 460, in particular an optimizer or a parameter optimizer. A parameter is ascertained by processor 460 from a data set stored in memory 450. Parameter θ may be assigned by processor 460 to the vehicle to which the recorded data sets from the memory are assigned.

Parameter θ is transmitted via a data line from processor 460 to further receiver 130 via communication interface 300. Parameter θ may be transmitted to further receiver 130 of the vehicle to which parameter θ is assigned.

Parameter θ is transmitted via a further data line to a further processor 470 within remote processing unit 400.

Further processor 470 is configured to ascertain information content I(T) as a function of parameter θ and a data set U(dTK), Y(dTK), which is assigned to the vehicle to which parameter θ is assigned. For this purpose, further processor 470 is configured to read a corresponding data set U(dTK), Y(dTK) from memory 450.

Further processor 470 is configured to transmit information content I(T) via a data line from processor 470 to further receiver 130 using communication interface 300.

Information content I(T) may be transmitted to further receiver 130 of the vehicle to which information content I(T) is assigned.

It may be provided to evaluate multiple data sets Ui(dTK), Yi(dTK) of the same vehicle and/or multiple data sets Ui(dTK), Yi(dTK) of different vehicles in order to ascertain a parameter θ and an information content I(T).

It may be provided to ascertain one or multiple parameter(s) θ and/or multiple values for information content I(T).

It may be provided to transmit parameters θ and/or values of information content I(T) to the respectively assigned vehicle and/or multiple non-assigned vehicles.

What is claimed is:

1. A method for parameterizing a functional software of a vehicle, the method comprising:
    receiving, by a processing unit within the vehicle, a data set including information about a vehicle state, the received data set including: (i) measured engine speeds of the vehicle and/or measured engine torques of the vehicle, and (ii) times at which the measured engine speeds and/or the measured engine torques were measured;
    ascertaining, by the processing unit, an information content of the received data set as a function of: (i) the received measured engine speeds and/or measured engine torques, and (ii) the received times, and as a function of a predetermined model which models a behavior of the vehicle;
    comparing, by the processing unit, the ascertained information content to a received further information content, the received further information content being received by the processing unit from a remote processing unit outside the vehicle;
    transmitting, by the processing unit, the received data set via a communication interface to the remote processing unit outside the vehicle as a function of a result of the comparison; and
    receiving, at the processing unit, information about at least one parameter for influencing the vehicle behavior, which was transmitted by the remote processing unit outside the vehicle, via the communication interface.

2. The method of claim 1, wherein the received data set is stored in a buffer, contents of the buffer being transmitted via the communication interface to the remote processing unit outside the vehicle only when the ascertained information content exceeds a predefined threshold value.

3. The method of claim 1, wherein a respective information content is ascertained for each of a plurality of received data sets, and the data sets are stored as a function of their respective information content.

4. The method of claim 1, wherein the received data set is deleted when a memory space usage exceeds a threshold value for the memory space usage, and the ascertained information content is below a predefined threshold value.

5. The method of claim 1, wherein parameters received at the processing unit in the vehicle are used to influence the vehicle behavior with the aid of the functional software.

6. The method of claim 1, wherein the parameters are transmitted from the local processing unit in the vehicle to a control unit.

7. The method of claim 1, wherein the information about the vehicle state is received from a control unit in the vehicle on which the functional software runs.

8. The method of claim 1, wherein a parameter optimization is carried out at the remote processing unit outside the vehicle as a function of one or multiple data set(s) received from the processing unit in the vehicle.

9. The method of claim 8, wherein the parameter optimization or ascertainment of the received further information content is carried out as a function of multiple data sets which are received from different vehicles by the remote processing unit outside the vehicle.

10. The method of claim 8, wherein the remote processing unit outside the vehicle transmits the result of the parameter optimization to the local processing unit in the vehicle.

11. The method of claim 1, wherein the received further information content received by the processing unit from the remote processing unit outside the vehicle is ascertained at the remote processing unit outside the vehicle as a function of multiple data sets received from the local processing unit in the vehicle by the remote processing unit outside the vehicle.

12. The method of claim 1, wherein the ascertained information content and the received further information content are both Fisher information.

13. The method of claim 12, wherein the received data set is transmitted to the remote processing unit only when the ascertained information content exceeds the received further information content.

14. A device for parameterizing a functional software of a vehicle, comprising:
    a processor device within the vehicle, configured to perform the following:
        receiving, by the processor device within the vehicle, a data set including information about a vehicle state, the received data set including: (i) measured engine speeds of the vehicle and/or measured engine torques of the vehicle, and (ii) times at which the measured engine speeds and/or the measured engine torques were measured;
        ascertaining, by the processor device, an information content of the received data set as a function of: (i) the received measured engine speeds and/or measured engine torques, and (ii) the received times, and as a function of a predetermined model which models a behavior of the vehicle;
        comparing, by the processor device, the ascertained information content to a received further information content, the received further information content being received by the processor device from a remote processing unit outside the vehicle;
        transmitting, by the processor device, the received data set via a communication interface to the remote processing unit outside the vehicle as a function of a result of the comparison; and receiving, at the processor device, information about at least one parameter for influencing the vehicle behavior, which was transmitted by the remote processing unit outside the vehicle, via the communication interface.

15. The device of claim 14, wherein the ascertained information content and the received further information content are both Fisher information.

16. The device of claim 15, wherein the received data set is transmitted to the remote processing unit only when the ascertained information content exceeds the received further information content.

17. A non-transitory computer readable medium on which is stored a computer program, which is executable by a processor, comprising:
- a program code arrangement having program code for parameterizing a functional software of a vehicle, the program code, when executed by the processor, causing the processor to perform the following:
    - receiving, by the processor, a data set including information about a vehicle state, the received data set including: (i) measured engine speeds of the vehicle and/or measured engine torques of the vehicle, and (ii) times at which the measured engine speeds and/or the measured engine torques were measured;
    - ascertaining, by the processor, an information content of the received data set as a function of: (i) the received measured engine speeds and/or measured engine torques, and (ii) the received times, and as a function of a predetermined model which models a behavior of the vehicle;
    - comparing, by the processor, the ascertained information content to a received further information content, the received further information content being received by the processor from a remote processing unit outside the vehicle;
    - transmitting, by the processor, the received data set via a communication interface to the remote processing unit outside the vehicle as a function of a result of the comparison; and
    - receiving, at the processor, information about at least one parameter for influencing the vehicle behavior, which was transmitted by the remote processing unit outside the vehicle, via the communication interface;
    wherein the processor is within the vehicle.

18. The non-transitory computer readable medium of claim 17, wherein the ascertained information content and the received further information content are both Fisher information.

19. The non-transitory computer readable medium of claim 18, wherein the received data set is transmitted to the remote processing unit only when the ascertained information content exceeds the received further information content.

* * * * *